(12) United States Patent
Yamamoto et al.

(10) Patent No.: US 6,657,183 B2
(45) Date of Patent: Dec. 2, 2003

(54) AMUSEMENT SYSTEM USING LIVING BODY MEASUREMENT BY LIGHT, HEAD SETTER FOR THE AMUSEMENT SYSTEM, AND PROGRAM FOR USE IN THE AMUSEMENT SYSTEM

(75) Inventors: Tsuyoshi Yamamoto, Kawagoe (JP); Kosuke Ohashi, Tokyo (JP); Hironari Nakata, Saitama (JP); Atsushi Maki, Fuchu (JP); Hideaki Koizumi, Tokyo (JP); Mitsuru Oonuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/939,601

(22) Filed: Aug. 28, 2001

(65) Prior Publication Data

US 2002/0100867 A1 Aug. 1, 2002

(30) Foreign Application Priority Data

Jan. 31, 2001 (JP) ........................... 2001-022923

(51) Int. Cl.⁷ ............................................. H01J 40/14
(52) U.S. Cl. ..................... 250/221; 250/227.11; 356/41
(58) Field of Search ................... 250/227.25, 573–575, 250/227.11, 222; 600/323, 310, 544, 545; 356/40, 41; 463/36

(56) References Cited

U.S. PATENT DOCUMENTS

| | | | | |
|---|---|---|---|---|
| 5,111,817 A | * | 5/1992 | Clark et al. | 356/41 |
| 5,853,370 A | * | 12/1998 | Chance et al. | 600/323 |
| 5,974,338 A | * | 10/1999 | Asano et al. | 600/322 |
| 6,001,065 A | * | 12/1999 | DeVito | 600/544 |
| 6,215,403 B1 | * | 4/2001 | Chan et al. | 340/573.1 |
| 6,334,065 B1 | * | 12/2001 | Al-Ali et al. | 600/323 |

FOREIGN PATENT DOCUMENTS

| | | | |
|---|---|---|---|
| JP | 05-300887 | * | 11/1993 |
| JP | 9-149894 | | 6/1997 |
| JP | 09-149894 | * | 10/1997 |

OTHER PUBLICATIONS

Applied Optics, vol. 33, No. 28, Oct. 1, 1994, "Experimental Study of the Effect of Absorbing and Transmitting Inclusions in Highly Scattering Media", N. Bruce, pp. 6692–6698.

* cited by examiner

Primary Examiner—David Porta
Assistant Examiner—Stephen Yam
(74) Attorney, Agent, or Firm—Mattingly, Stanger & Malur, P.C.

(57) ABSTRACT

Disclosed herein is an amusement system that can be used and enjoyed by different persons without using the brain continuously and with little feeling of fatigue and which permits setting a probe at any spot on the head of the subject. The amusement system includes irradiators for irradiating the subject with light, light detectors for detection of the light that has been emitted from said irradiator and which has propagated through the living body, signal processors for processing the signal of light intensity detected by said detector and display units that show the processing results from the signal processor. The range of display of a change in intensity of said transmitted light according to the results of a test task carried out on said living body.

2 Claims, 18 Drawing Sheets

AMUSEMENT SYSTEM USING LIVING BODY MEASUREMENT BY LIGHT, HEAD SETTER FOR THE AMUSEMENT SYSTEM, AND PROGRAM FOR USE IN THE AMUSEMENT SYSTEM

BACKGROUND OF THE INVENTION

The present invention relates to measurement of light propagated through a living body for determination of metabolite therein using light. More particularly, the present invention concerns an amusement system based on measurement of light passed through the living body.

A living body inputting device and a living body control device based on measurement of light propagated through the living body have been disclosed in Japanese Patent Application Laid-open No. 9-149894 that are used for a computer, game, environmental control apparatus, learning degree judgment apparatus, alarm for vehicles, diagnosis and alarm for medical uses, lie detector, intention-indicating apparatus, information transfer unit etc. Those apparatuses disclosed by the patent application involve measuring localized brain functions and inputting the results in an outside unit. Now Japanese Patent Application Laid-open No. 9-149894 will be described.

A subject is irradiated with light by a light source such as semiconductor laser, light-emitting diode or lamp through an optical waveguide such as optical fiber for irradiation (hereinafter generically referred to as light irradiator). The most suitable wavelength of light used for the measurement is in the neighborhood of 800 nanometers that is highly transmitted by the biological tissue, but is not limited to this wavelength band. One end of the optical waveguide is connected to a light source and the other end is in contact with the skin of the subject. The light that is imparted to the living body is intensively scattered by the biological tissues. Part of the scattered light passes through the cerebral cortex where high-grade brain functions such as motion, sense and language are concentrated and reaches a spot on the head skin some 30 mm (in the case of adults) away from the point of light irradiation. A light detector is provided to detect the intensity of light that has been propagated through the living body. The light detector is formed of an optical waveguide such as optical fiber and a photoelectron device such as photodiode and photomultiplier which is brought in contact with one end of the optical waveguide. Optical signals are converted into electric signals by the light detector. And the electric signals are processed by electronic computer.

Now, let it be supposed that the brain is activated by moving body parts (hands, legs and fingers and toes). When the brain is activated, the brain blood in the cerebral cortex undergoes a secondary change (increases or decreases) to supply the activated part of the brain with oxygen and glucose. If near infrared rays (with a wavelength near 800 nanometers) are used for measurement, hemoglobin in the blood (oxidation hemoglobin and reduction hemoglobin) absorbs the light given off for measurement, and the amount of light reaching the optical fiber for detection decreases as the a mount of hemoglobin increases with the activity of the brain. That is, a change in the intensity of detected light reflects the activity of the brain. A change in the light intensity is measured and the computer is controlled using the measured results, whereby an input apparatus is formed to control the computer by measuring a person's thought reflecting mental condition and brain activity.

The prior art discloses arrangements that can be used to create a game (amusement system) by detecting brain activities To create an actual amusement system, however, it is necessary to provide an amusement system that different persons can use without feeling fatigue in addition to the above arrangements.

SUMMARY OF THE INVENTION

In view of the prior art described above, it is an object of the present invention to provide an amusement system based on living body measurement by light which can be used pleasantly without the subject using hands and legs and without feeling fatigue and also to provide a head setter to be worn by the living body or player.

To achieve the foregoing object, means to solve the problems according to the present invention will be explained.

First, the human brain structure and optical conditions like skin color are different from person to person. And, even if the same intensity of light is shed on different players, the intensity of light detected (intensity of transmitted light) is different with persons. Therefore, the present invention provides contents that allow a player to enjoy a game, displaying on the screen the intensity of light that has been propagated through the living body even if light transmission characteristics are different from person to person.

Secondly, the present invention provides a method of showing brain activity results to the player. The human brain activity is generally impossible to see. According to the present invention, the human brain activity is measured using light. But a change in the intensity of transmitted light is very small in such a case. In the present invention, therefore, an amusement system is provided that can show brain activities to the player even if the change in transmitted light is very small.

Thirdly, in the amusement system, the condition of the object displayed on the screen is changed according to the measurement results of the brain activity. The brain to be active continuously (to always use the brain) would make the player feel fatigue. Therefore, the present invention provides an amusement system that allows the player to enjoy a game even if the brain does not work continuously by setting a period during which the condition of the object displayed on the screen changes according to signals reflecting the brain activity and a period during which the condition of the object changes according to any signal sent out from the computer irrespective of the brain activity.

Fourthly, the human brain activity is different from person to person if the activity area is the frontal lobe which is said to reflect the emotion etc. Therefore, the present invention provides a head setter (probe) for living body measurement by light that permits shedding light on any spot of the frontal lobe and detecting the light.

According to an aspect of the present invention, there is provided an amusement system using living body measurement by light, the system comprising: a light irradiator for irradiating a living body with light; a light detector for detecting the light that has been emitted from the irradiator and which has propagated through the living body; a signal processor for processing the signal of light intensity detected by the detector; and a display unit for displaying the processing results from the signal processor; wherein arrangements are so made as to set the range of displaying on the screen of the display unit a change in intensity of the transmitted light according to the results of a test task carried out on the living body.

According to an aspect of the present invention, there is provided an amusement system using living body measurement by light, the system comprising: a light irradiator for irradiating a living body with light; a light detector for detecting the light that has been emitted from the irradiator and which has propagated through the living body; a signal processor for processing the signal of light intensity detected by the detector; and a display unit for displaying the processing results from the signal processor; wherein arrangements are so made as to time-wise integrate a change in the intensity of light that has been propagated through the living body and to reflect the integrated results in an object displayed on the screen of the display unit.

According to an aspect of the present invention, there is provided an amusement system using living body measurement by light, the system comprising: a light irradiator for irradiating a living body with light; a light detector for detecting the light that has been emitted from the irradiator and which has propagated through the living body; a signal processor for processing the signal of light intensity detected by the detector; and a display unit for displaying the processing results from the signal processor; wherein arrangements are so made that the condition of an object shown on the display unit changes at any time intervals using the signal of light intensity that has been propagated through the living body and a signal that is issued by the signal processor.

According to an aspect of the present invention, there is provided an amusement system using living body measurement by light, the system comprising: a light irradiator for irradiating a living body with light; a light detector for detecting the light that has been emitted from the irradiator and which has propagated through the living body; a signal processor for processing the signal of light intensity detected by the detector; and a display unit for displaying the processing results from the signal processor; wherein arrangements are so made to set a period during which the condition of at least one object displayed on the screen of the display unit changes according to a change in the intensity of light that has been propagated through the living body and a period during which the condition of the object changes according to any signal issued by the signal processor.

Furthermore, in the above constitution, the display range of the intensity of transmitted light displayed on the screen of the display unit is decided on the basis of the maximum value and minimum value of the intensity of transmitted light that is detected.

In addition, according to an aspect of the present invention, there is provided an amusement system using living body measurement by light, the system comprising: a first light irradiator for irradiating a first living body with light; a second light irradiator for irradiating a second living body with light; a first light detector for detecting the light that has been emitted from the first irradiator and which has propagated through the first living body; a second light detector for detecting the light that has been emitted from the second irradiator and which has propagated through the second living body; a signal processor for processing the signal of light intensity detected by the first and second detectors; and a display unit for displaying the processing results from the signal processor; wherein arrangements are so made that the intensities of light rays which have been propagated through the first and second living bodies are each time-wise integrated and the integrated results are reflected in an object displayed on the screen of the display unit, thereby displaying the degree of affinity between the first and second living bodies.

Furthermore, according to an aspect of the present invention, there is provided a head setter for an amusement system using living body measurement by light, the head setter having: an optical fiber holder provided with at least a pair of optical fibers, one for irradiation and the other for detection; and a flexible resin part provided with a guide that enables the optical fiber holder to move in a specific direction; wherein the optical fiber holder is detachably provided on the guide of the flexible resin part.

DESCRIPTION OF THE PREFERRED EMBODIMENTS

Embodiments of the amusement system according to the present invention will be explained hereinafter.

Figure 1:
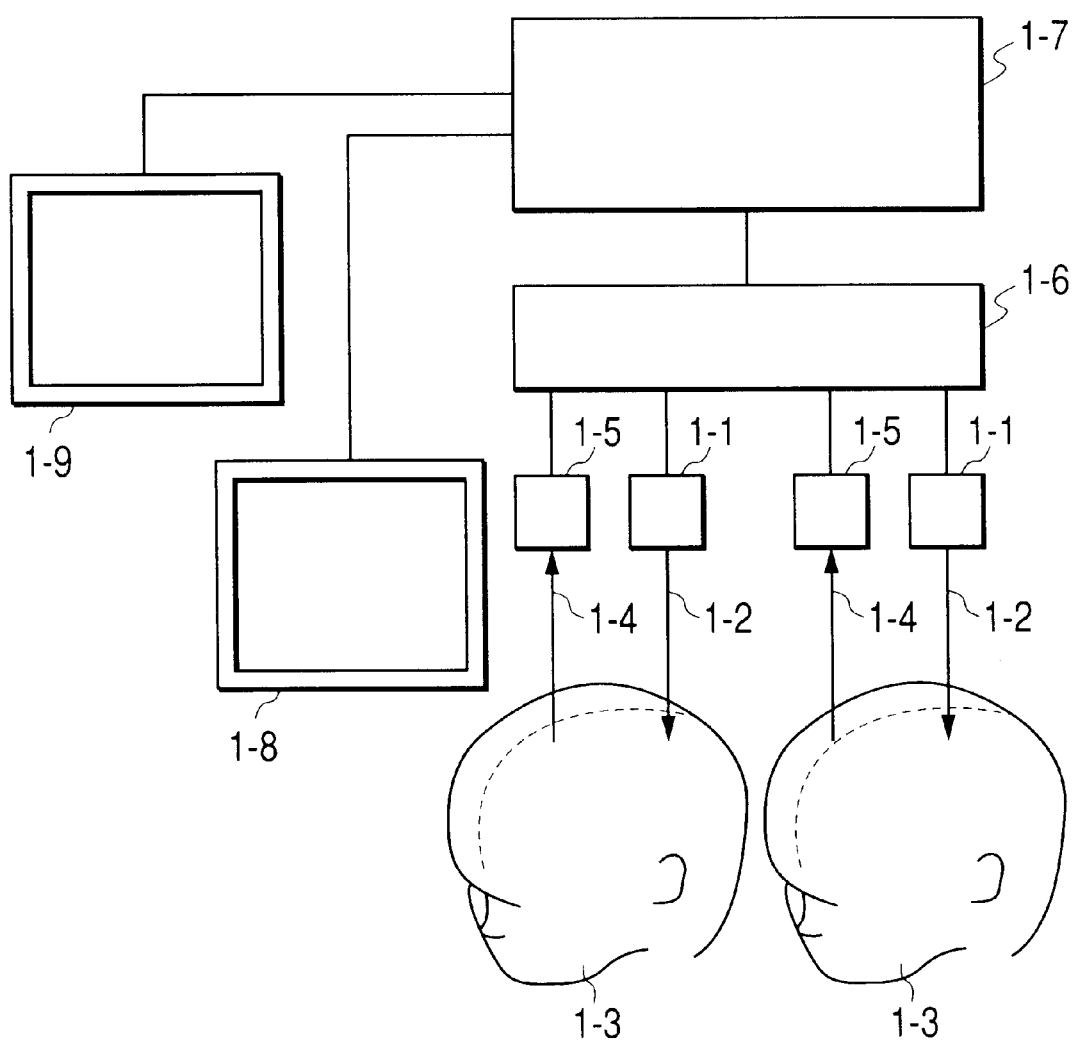
FIG. 1 is a view showing the fundamental device constitution of an amusement system according to the present invention.

FIG. 1 shows the fundamental device constitution of an amusement system according to the present invention. Reference numeral 1-1 indicates a light source such as semiconductor laser, light-emitting diode or lamp. Light from those light sources is shed on game players (1-3) through optical waveguides (1-2) such as optical fiber. To illustrate, one end of the optical fiber is brought in contact with the skin of the players. In the present invention, the embodiments will be explained on assumption that there are two players. But it is not restrictive. The number of players may be one or three or more, and a game could be conducted in the same way.

The light that has been propagated through the player returns through an optical waveguide indicated in reference numeral 1-4 as opposed to the optical waveguide (1-2) that leads light to the head. The distance between the optical fiber indicated in 1-2 and the optical waveguide indicated in 1-4 can be set freely. For detecting the brain activity of an adult, for example, the suitable distance is 27 mm, which is indicated in an American magazine "Applied Optics" 1994, No. 33, from pp. 6692 to 6698—a report by N. C. Bruce entitled "Experimental Study of the effect of absorbing and transmitting inclusions in highly scattering media."

The optical waveguide indicated in 1-4 is connected to a light detector (1-5) such as photodiode or photomultiplier. The intensity of light that has been propagated through the living body is converted into an electrical signal by this photomultiplier.

(0023)

Next, the arrangement of a controller (1-6) that make up a signal processor and a computer (1-7) will be explained. The controller is electrically connected to the light source (1-1) and the light detector (1-5). This makes it possible to change the intensity of the light source and take into this controller the intensity of light that has been propagated through the living body. The controller outputs signals of measured results to the computer (1-7). The output of the computer (1-7) is sent out to a speaker (1-8), a display unit like the screen (1-9). Thus, a change in the intensity of light that has been propagated through the living body can be converted into contents to be processed within the computer and can be shown to the players. It is to be noted that the display unit may be provided within the computer (1-7) or may be provided separate therefrom.

In the present embodiment, the number of players is two. The living body measurement method by light permits simultaneous measurement of changes in blood volume of a plurality of persons by a small measuring apparatus unlike other living body measurement method by light such as magnet and irradiation rays, for example. In the living body measurement method by light according to the present invention, it is possible to measure changes in blood volume in the heads of two persons at the same time as mentioned above. Therefore, there is no problem at all even if two players or more use the amusement system. For purpose of simplicity, the embodiment of the present invention will be described hereinafter assuming that the number of players is two.

Screen arrangements of the screen (1-9) in one embodiment will be explained with reference to FIG. 2. Reference numeral 2-1 indicates the locations where the names of the players are shown. In the present embodiment, the players are named "Tom" and "Mary". Fives round bars (2-2) each on the left and right sides in the drawing are indicators to show changes in the intensity of transmitted light that is propagated through the living body of each player—changes measured using the measuring apparatus shown in FIG. 1. In the present embodiment, the intensity of transmitted light for each player is indicated in five grades. The number of grades is not limited to five. The use of these indicators will be described later with reference to another drawing.

Figure 2:
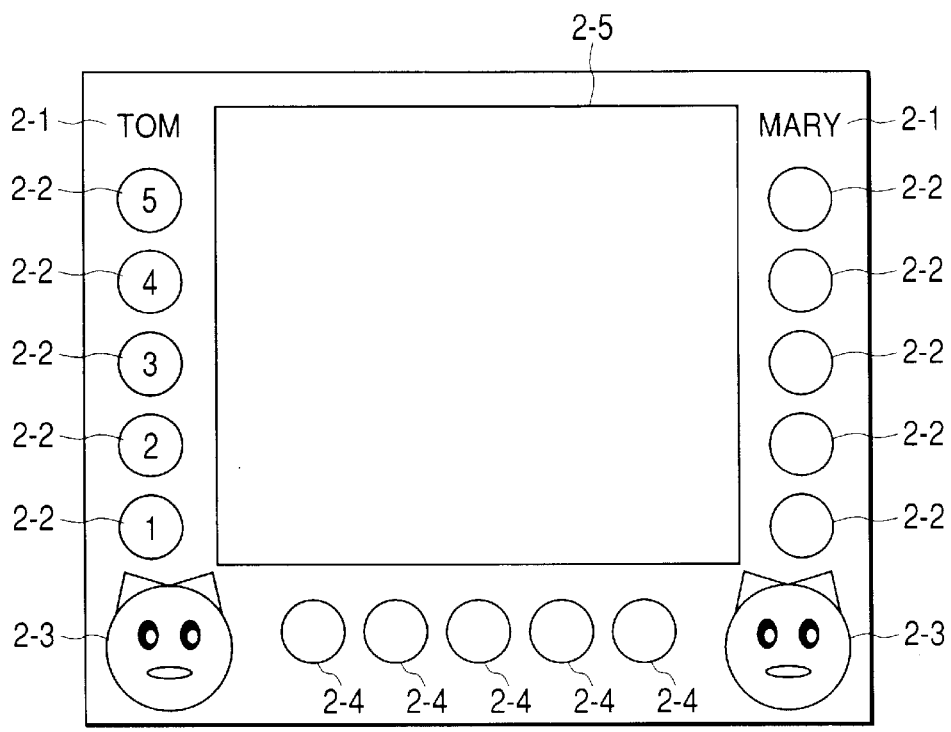
FIG. 2 is a view showing a screen of the amusement system in FIG. 1.

Reference numerals 2-3 in FIG. 2 are face images of the players (Tom and Mary) that indicate a change in the intensity of transmitted light. That is, the face image changes according to the intensity of light that has been propagated through the living body. Changes of the face image will also be described later with reference to a separate drawing. Reference numerals 2-4 are indicators to show the proceeding of a game, indicating to the player in which scene the game is now as the game goes on. Reference numerals 2-5 is a display screen on which a moving image is displayed. The image shown on this display screen will be described later with reference to a separate drawing.

Next, an embodiment of contents in which a plurality of players in different optical condition can enjoy a game with reference to FIGS. 3, 4, 5 and 6 will be explained.

Figure 3:
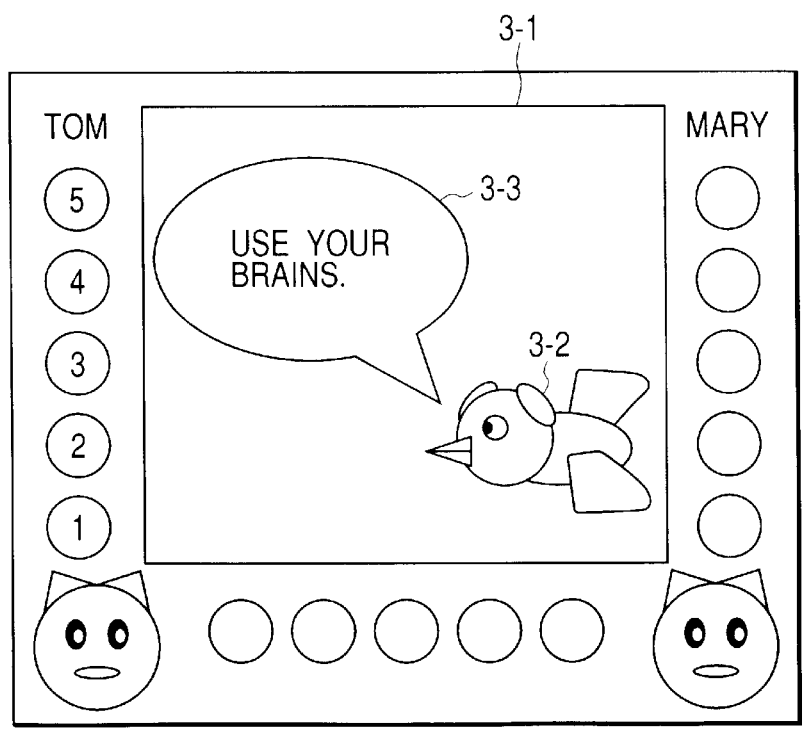
FIG. 3 is a view showing an example of indicating information (the start of the test task) to a player.

FIG. 3 shows an example of indicating to the player on the screen shown in FIG. 2 that first, a test task will be conducted. Propagation characteristics of light through the living body depends mainly on optical properties, that is, light scattering coefficient and light absorption coefficient in the living body. Reaction to a moving object, that is, physical properties like agility are different from person to person. Also, characteristics of brain activity (dependence on time of change in blood volume) are different with persons. As shown in FIG. 3, therefore, each player is told that a test task will begin. In the present embodiment, a character (3-2) and a message (3-3) are shown on the display screen (3-1). While the message is shown on the screen, the message "Use your brains" may be given acoustically using the speaker (1-8) shown in FIG. 1.

Figure 4:
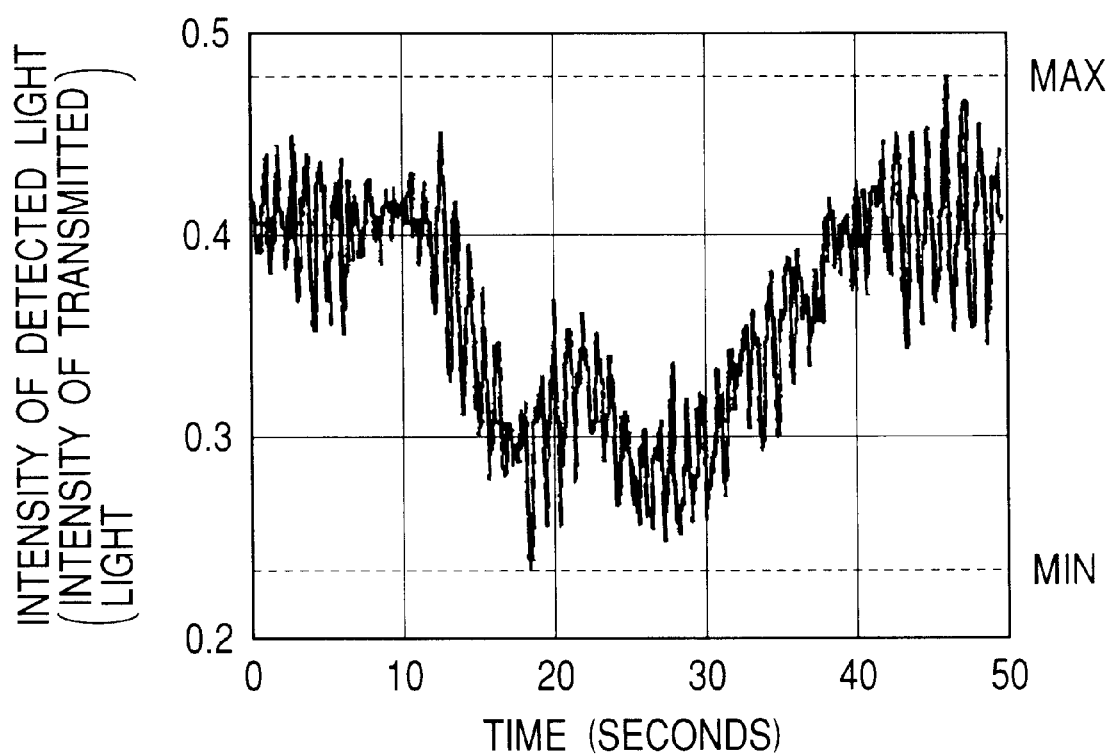
FIG. 4 is a view showing an example of the result of the brain function measurement

Next, an example of measured results of brain activity will be explained with reference to FIG. 4. The measured results are measurements of light propagated through the living body which are converted into electric signals in the controller (1-6) in FIG. 1. In this example, the activity of the brain was started 10 seconds after the measurement began. As the blood volume increases, the light sent out for measurement is absorbed, and therefore the intensity of the light that is propagated through the living body decreases. When the activity of the brain was ended 30 seconds after the start of measurement, the blood volume returned to the original level—the level before the activity of the brain started—and the intensity of transmitted light also went up to the level before the brain began to function. "MAX" and "min" in FIG. 4 mean the "maximum value" and the "minimum value" respectively.

Figure 5:
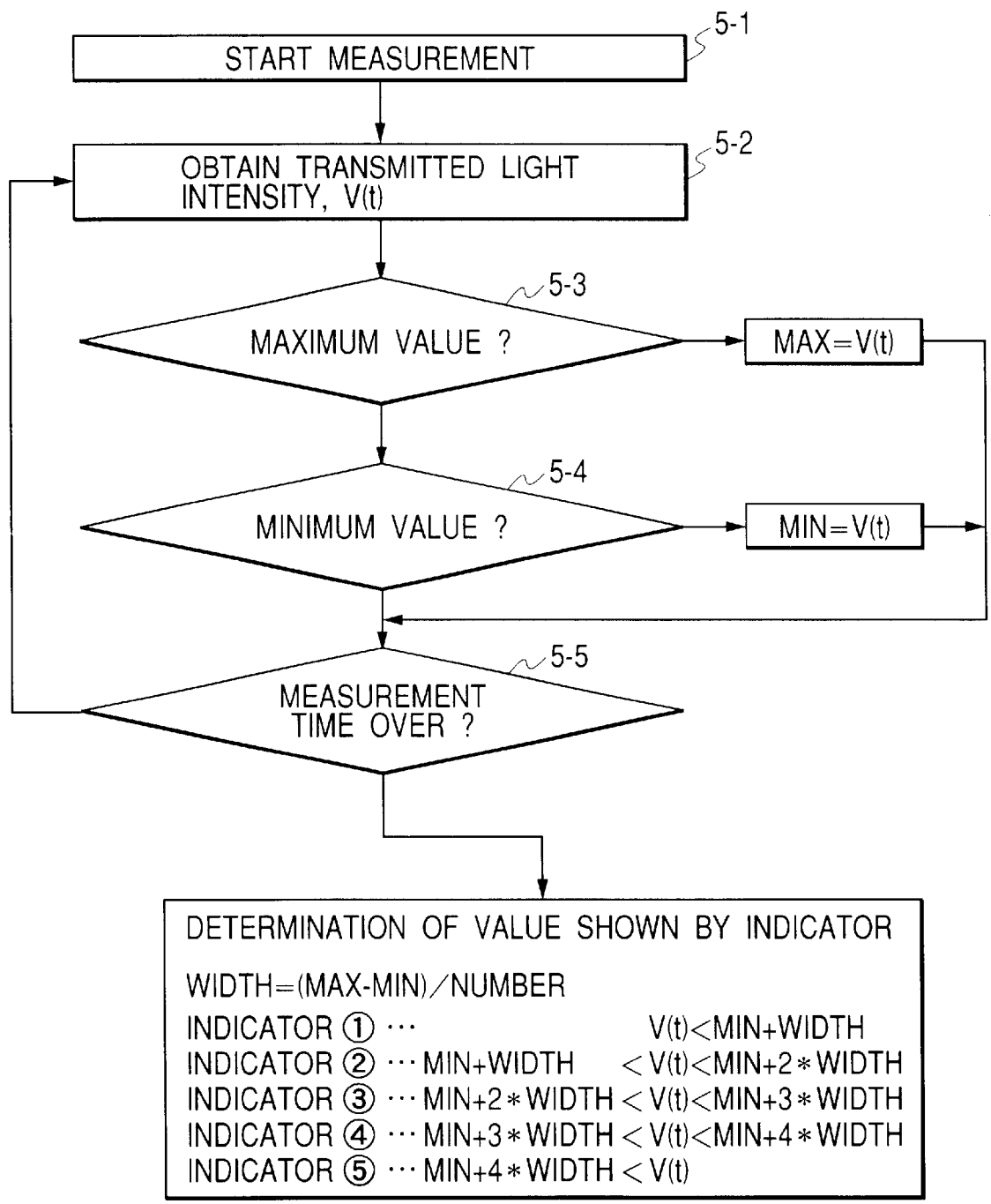
FIG. 5 is a flowchart showing how to determine the maximum/minimum value of the blood volume change associated with the brain activation.

Next, how to decide on the maximum value and the minimum value will be described with reference to FIG. 5. First, measurement is started (5-1). Then, transmitted light intensity (V(t)) is acquired (5-2), using the controller (1-6). Whether the detected transmitted light intensity is the maximum or the minimum is judged (5-3, 5-4). Thus, it is possible to qualitatively determine the intensity of transmitted light propagated through the living body and change in light intensity with the activity of the brain which are different from player to player. Then, whether the measurement time is over is judged (5-5). In the example shown in FIG. 4, for example, the measurement time is 50 seconds. After that, the way of displaying the results is decided on.

First, the indication width (for each intensity grade) is worked out as follows:

$$\text{width}=(\text{MAX}-\text{min})/\text{number (of indicators)} \qquad (1)$$

The indication range for the respective indicators shown in FIG. 2 (5 indicators named 1, 2, 3, 4, 5 from the bottom) is defined as follows:

Indicator 1

$$V(t)<\text{min}+\text{width} \qquad (2)$$

Indicator 2

$$\text{min}+\text{width} < V(t) < \text{min}+2\times\text{width} \quad (3)$$

Indicator 3

$$\text{min}+2\times\text{width} < V(t) < \text{min}+3\times\text{width} \quad (4)$$

Indicator 4

$$\text{min}+3\times\text{width} < V(t) < \text{min}+4\times\text{width} \quad (5)$$

Indicator 5

$$\text{min}+4\times\text{width} < V(t) \quad (6)$$

Figure 6:
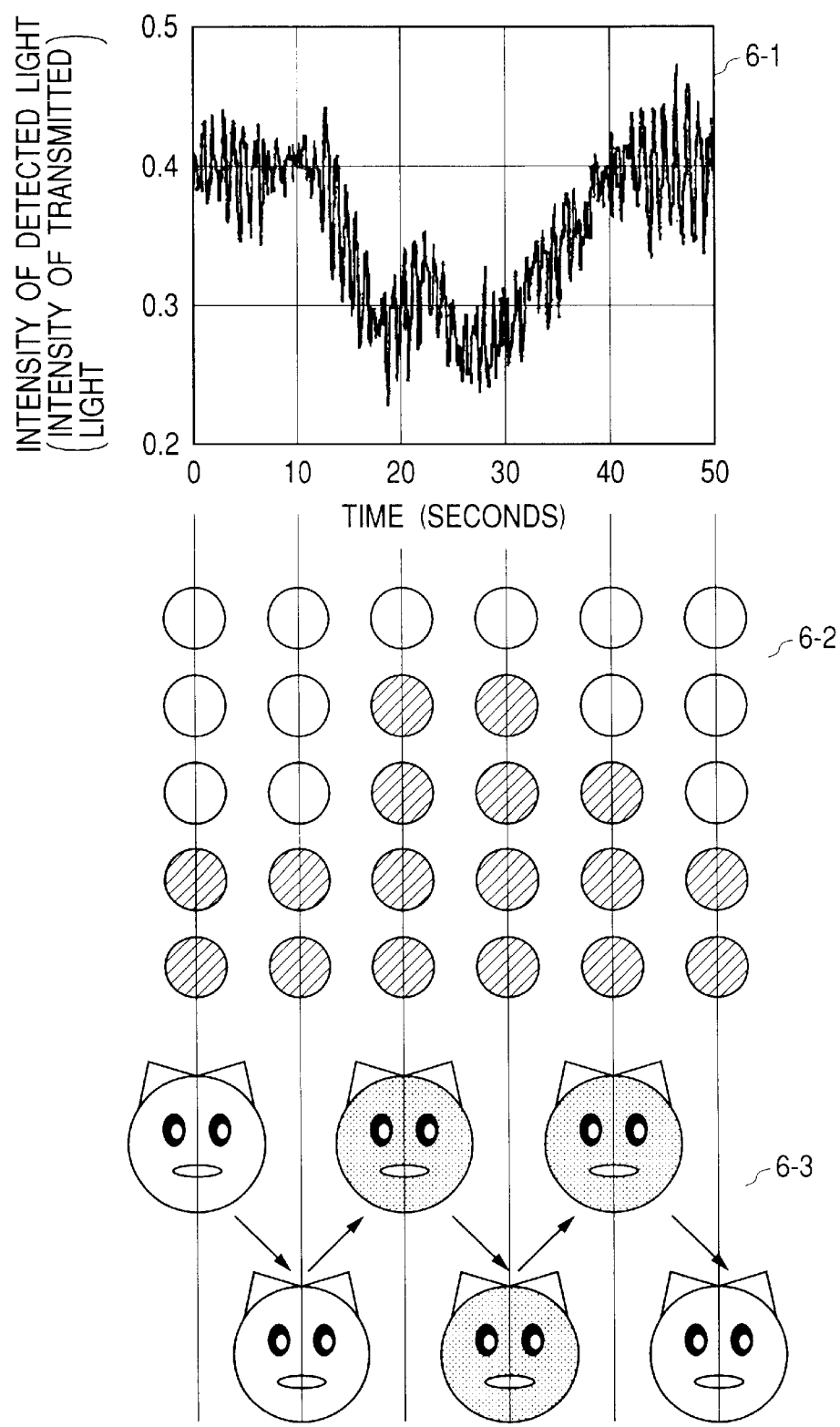
FIG. 6 is a view showing how to change the indicator and the face of the players in FIG. 2 in accordance with the change of the intensity of transmitted light for biological tissue.
Figure 7:
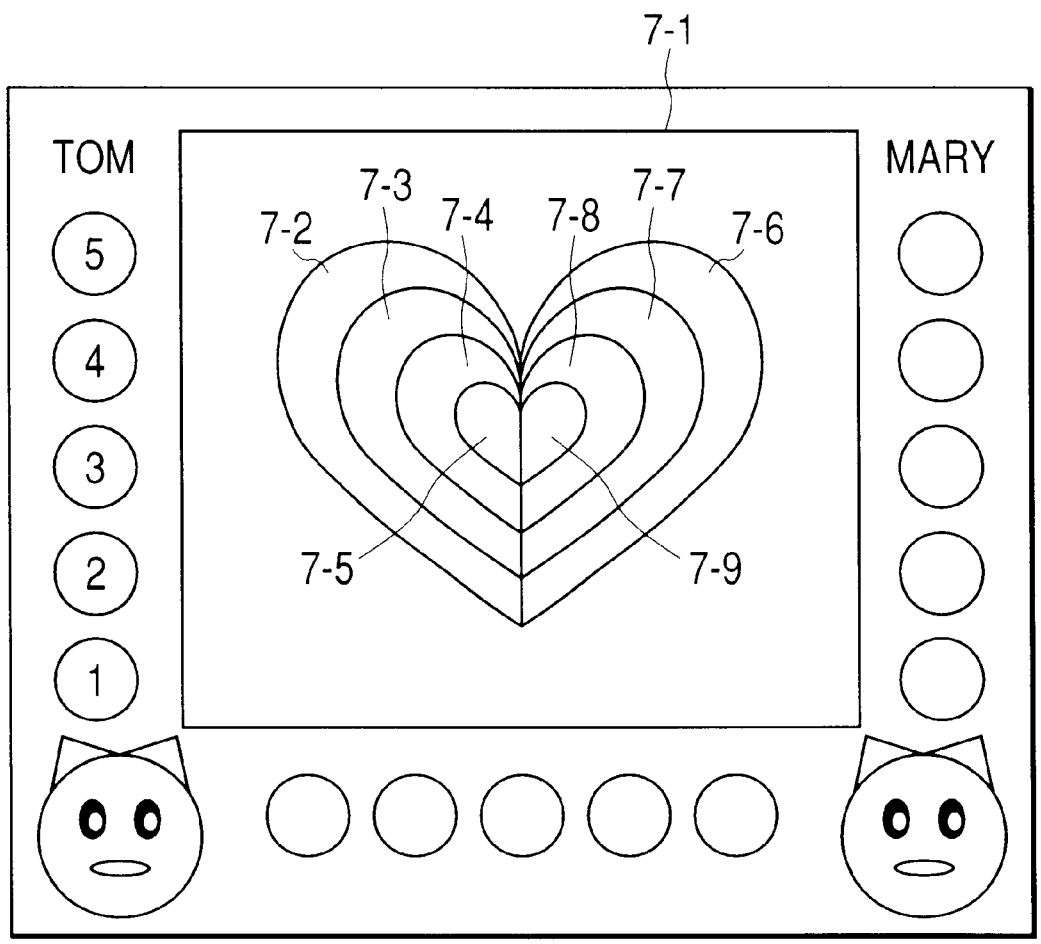
FIG. 7 is a view showing one of the examples to show the brain activation to the player.

And as shown in FIG. 6, it is possible to control the flickering of the indicators (6-2) shown in 2-2 in FIG. 2 according to blood volume change (6-1). Similarly, the face image of each player in FIG. 2 can be changed (in this example, the face color is changed) (6-3).

That way, it is possible to grasp the properties peculiar to each player, that is, the intensity of transmitted light that is propagated through the living body and a change in the intensity of transmitted light with the activity of the brain. Furthermore, even if two players are quite different in the intensity of transmitted light and its change, the change in blood volume is displayed in the indicators within the screen shown in FIG. 2, and the player can enjoy a game while actually grasping the amount of change.

Next, there will be described a method of using an amusement system that can show the brain activity to the player even if the change in the blood volume is small, which will be explained with reference to FIG. 7 to FIG. 11. Reference numeral 7-1 indicates a display screen, while 7-2, 7-3, 7-4, 7-5, 7-6, 7-7, 7-8, 7-9 indicate "heart" marks different in size. Those marks change in color according to the brain activity just as fluorescent lamps go on and off.

Figure 8:
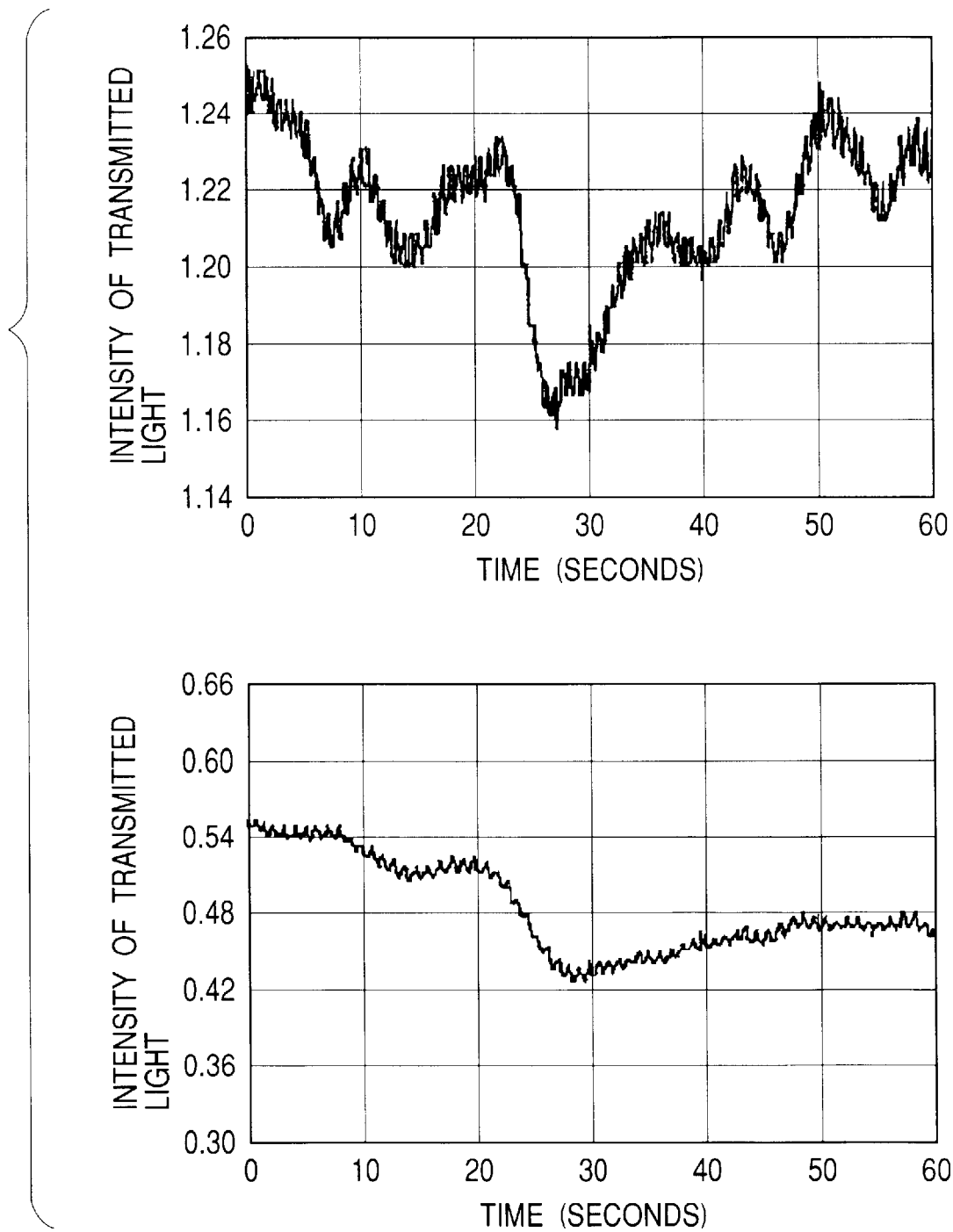
FIG. 8 is a view showing the intensity of transmitted light each two-players as a function of the time.

FIG. 8 is graphs showing changes with time in transmitted light that is propagated through the living bodes of two players (Tom and Mary). As shown in these two graphs, the change in detected light is small at 10 percent maximum. Therefore, the changes in blood volume shown in FIG. 8 are integrated.

Figure 9:
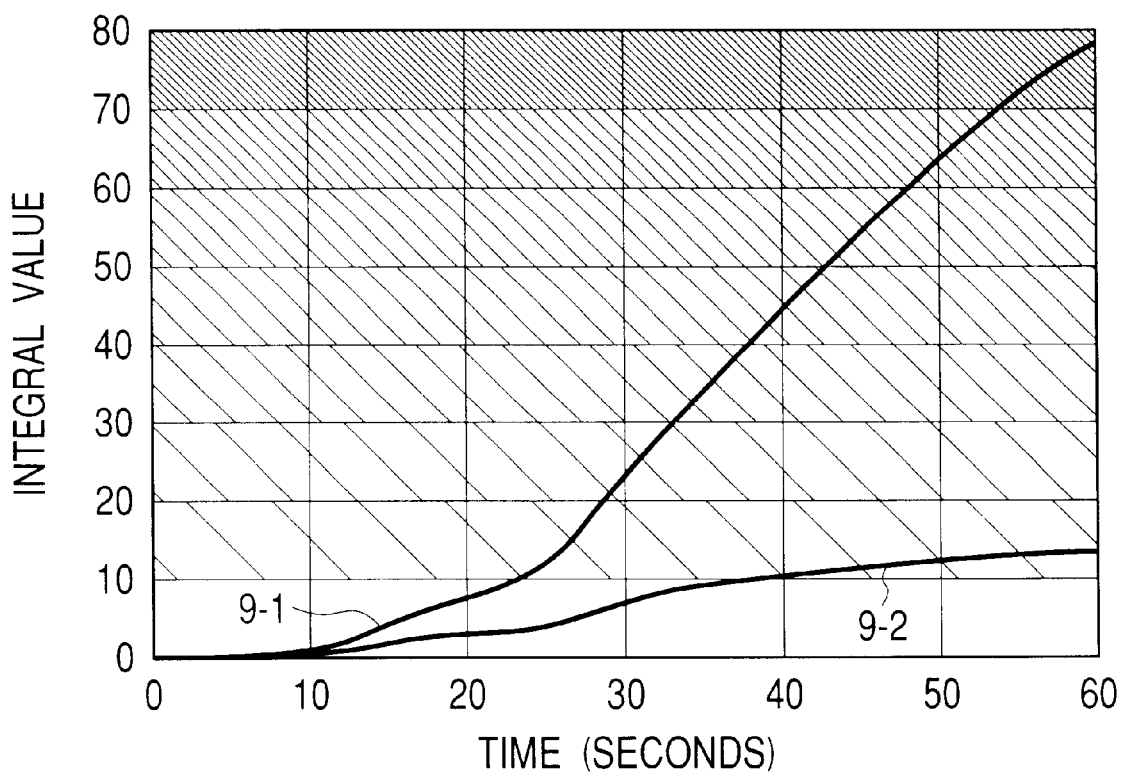
FIG. 9 is a view showing time-wise integrated values of the blood volume change.
Figure 10:
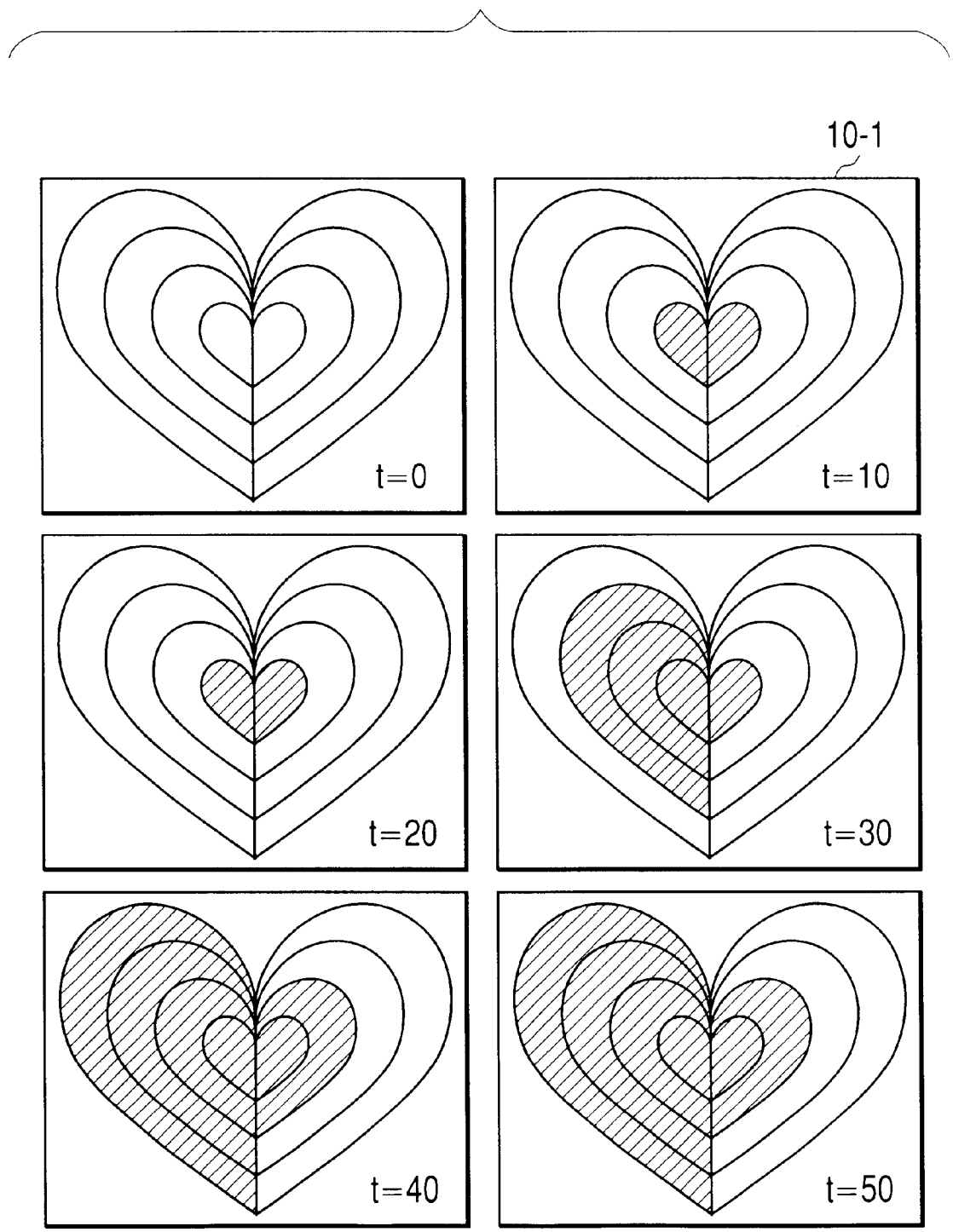
FIG. 10 is a view showing illumination of the heart mark.

Examples of the integrated results are shown in FIG. 9. In FIGS. 9, 9-1 and 9-2 show characteristics obtained by time-wise integrating the changes in blood volume of Tom and Mary in FIG. 2. The heart marks shown in 7-1 in FIG. 7 were changed according to the characteristics shown in FIG. 9 and the resulting heart marks are shown in FIG. 10.

The relation between FIG. 9 and FIG. 10 will be explained. In case the integrated value of changes in Tom's blood volume is not lower than 0 and not high than 10, the innermost parts (7-5 and 7-9 in FIG. 7) go on. In the example shown in FIG. 10, the heart lamps go and off every 10 seconds for a time period from t=0 to t=50. As the integrated value increases, a wider area will be illuminated intermittently (that is, the number of lamps that are turned on and off is increased).

Figure 11:
FIG. 11 is a view showing an example of the diagnosis result of the affinity.

Next, how the results are judged after measurement will be explained with reference to FIG. 11. For Tom's marks "1" (11-1) in FIG. 11, one lamp (7-5) only goes on after measurement is over. Similarly, for marks "2" (11-2), lamps 7-5 and 7-4 go on. For marks "3" (11-3), lamps 7-5, 7-4 and 7-3 go on. For marks "4" (11-4), lamps 7-5, 7-4, 7-3 and 7-2 go on. For Mary's marks "1" "2" "3" and "4" the lamps go on in the same way. And as shown in 11-5, the degree of affinity is judged on the basis of coincidence of the results of the two persons etc. and is notified. The degree of affinity may be notified in a voice using the speaker indicated in 1-8 or visually using the screen indicated in 1-9.

The agility is judged by measuring the player's reaction to the lighting or a voice from the speaker. The characteristics will be reflected in the checkpoints which will be described later.

Next, two contents of a game in which the player's fatigue is eased will be shown and explained with reference to FIG. 12 to FIG. 14 and FIG. 15 to FIG. 19.

Figure 12:
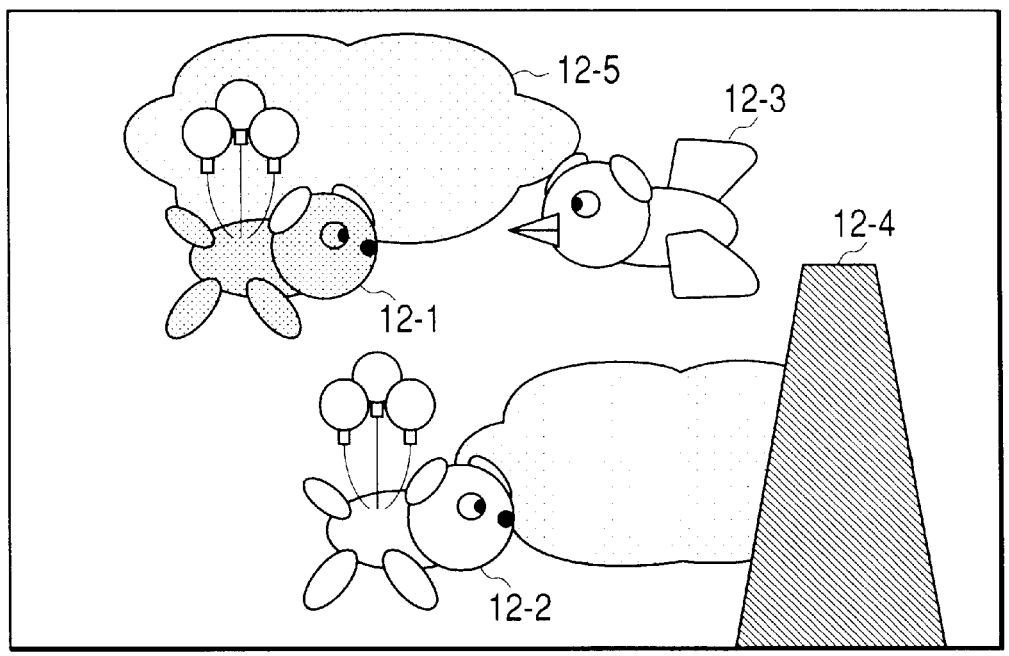
FIG. 12 is a view showing an example of contents [1] of the game that reduced the fatigue of the player.

First, the first contents will be explained. FIG. 12 is a display screen indicated in 2-5 in FIG. 2. On this screen, there are shown objects "dogs" (12-1 and 12-2) that reflect the brain activity of "Tom" and "Mary" and enemies of those objects—"a crow" (12-3) and "a mountain" (12-4). To make the screen look real, a cloud as in 12-5 may be added.

Figure 13:
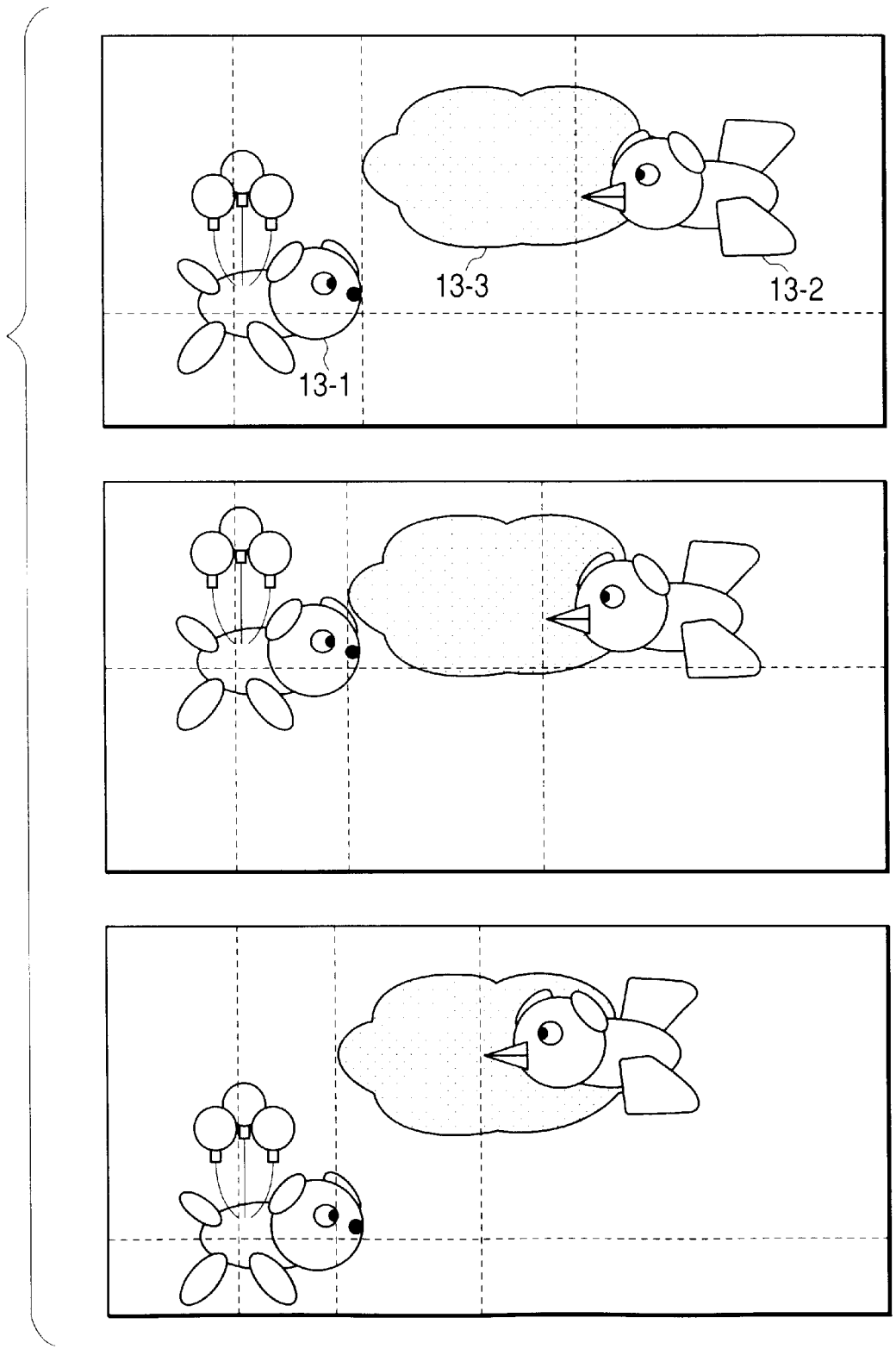
FIG. 13 is a view showing side scroll for each character.

To be more specific, as shown in FIG. 13, the altitude of the "dog" (13-1) alone is changed, while the "crow" is moved in both the vertical and horizontal directions to approach the "dog". The "cloud" (13-3) remains at an altitude and moves toward the "dog"

Figure 14:
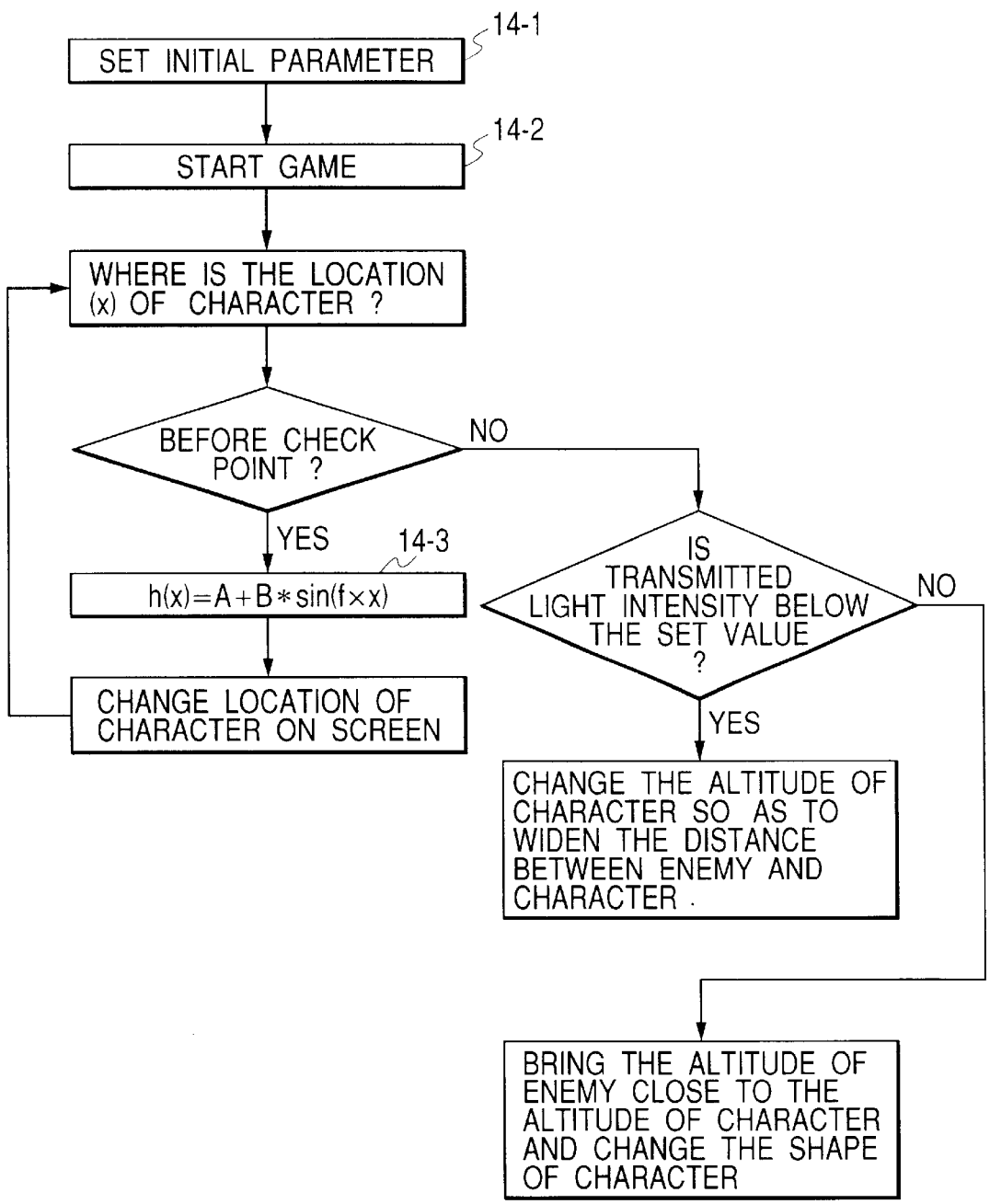
FIG. 14 is a flowchart of the game contents [1]

Next, a process of changing the object on the screen according to changes in blood volume that reflects the brain activity without the player feeling fatigue will be explained with reference to FIG. 14. First, the positions of the "dog," "crow" and "cloud" in the vertical and horizontal directions are set as initial parameters (14-1). Then, a game is started (14-2). First, the distance between the characters "dog" and "crow" is evaluated. And if the distance between the two positions is larger than a specific value, that is, if the "dog" is flying before the checkpoint, the altitude of the "dog" is controlled by the equation indicated in 14-3. Here, to express the variation of light passing through the living body as shown in FIG. 4, the trigonometric function is used in a pseudo manner. Needless to say, it does not means that this trigonometric function alone is applicable, but random numbers or rectangular function may be used with no problems.

The term checkpoint as used herein is to give a point where the object running usually on a program specified in advance starts to move on signals from the living body measurement apparatus. This checkpoint concerns the personality of the player and is so arranged that it cannot be seen by the player and cannot be used by other persons. Therefore, this checkpoint can also be set by a signal obtained from the aforementioned test task.

Meanwhile, when the "dog" is found on the checkpoint, the intensity of transmitted light at this point is compared with a certain reference value. When the intensity of transmitted light is smaller than the set value, it means that the brain works and the blood volume is increasing. In this case, since the brain works, it means that the fight against the enemy "crow" has been won and the result is that the enemy is avoided with the difference in altitude between the "dog" and "crow" widened. On the other hand, when the change in blood volume is small instead, the enemy "crow" is brought close to the "dog" until the object (character) of the "dog" is changed in shape (the balloons in FIG. 13 are burst, for example).

Figure 15:
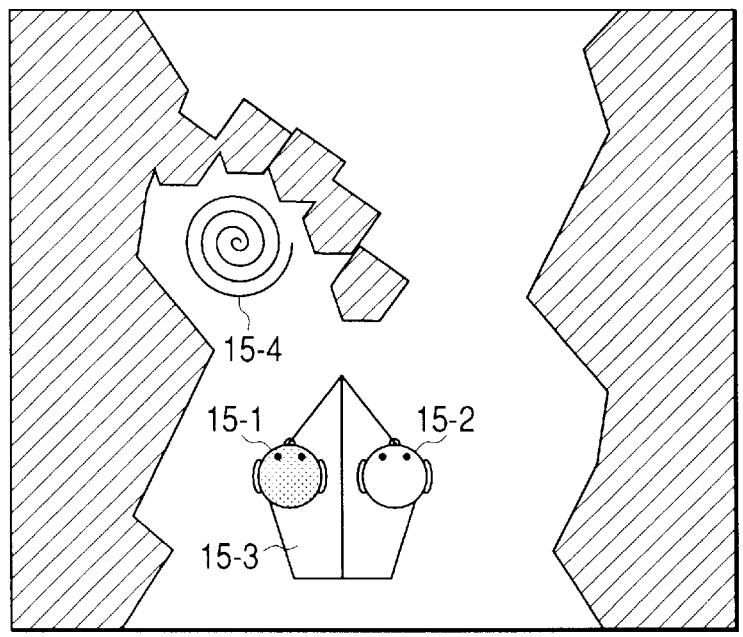
FIG. 15 is a view showing an example of contents [2] of the game that reduced the fatigue of the player.

The second contents as shown in FIG. 15 show that Tom (15-1) and Mary (15-2) go down a river in the same boat (15-3), while avoiding a swirl (15-4).

Figure 16:
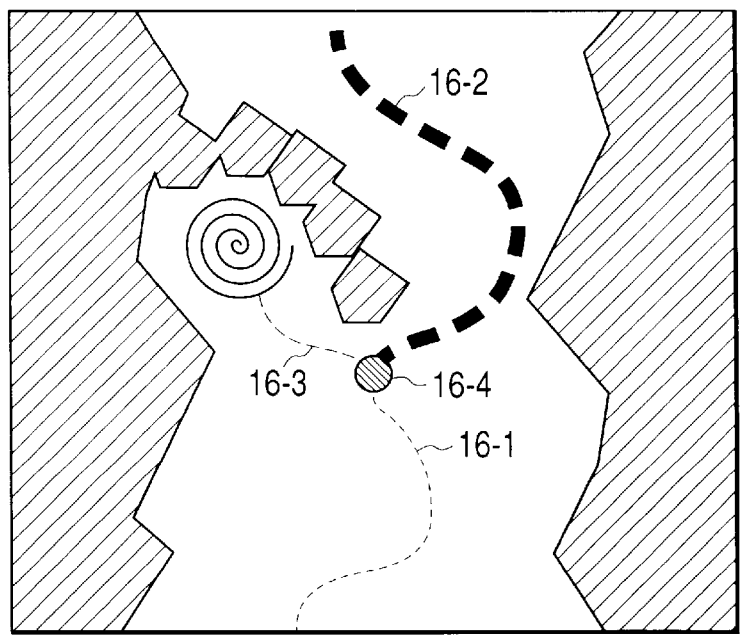
FIG. 16 is a view showing a checkpoint that determine the route of the boat and blood volume change that set up it previously in the game contents [2]

FIG. 16 shows the routes (16-1, 16-2, 16-3) the boat (15-3) follows. The routes are set beforehand and go as if a boat moves riding on the waves. And 16-4 indicates a checkpoint where it is determined on the basis of the change in blood volume which route is to be taken, route 16-2 or route 16-3 which leads to the swirl.

Figure 17:
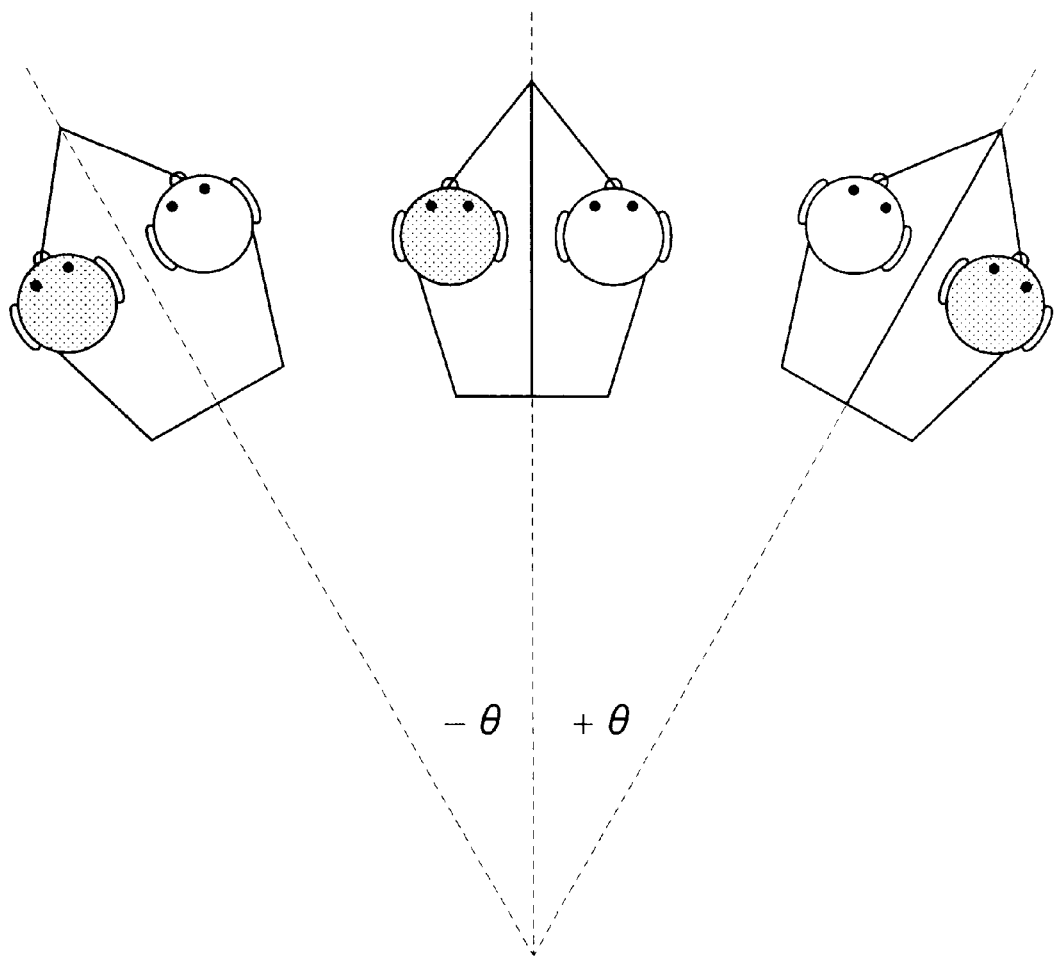
FIG. 17 is a view showing angle setting law [1] of the prow of the boat associated with the blood volume change of two players.
Figure 18:
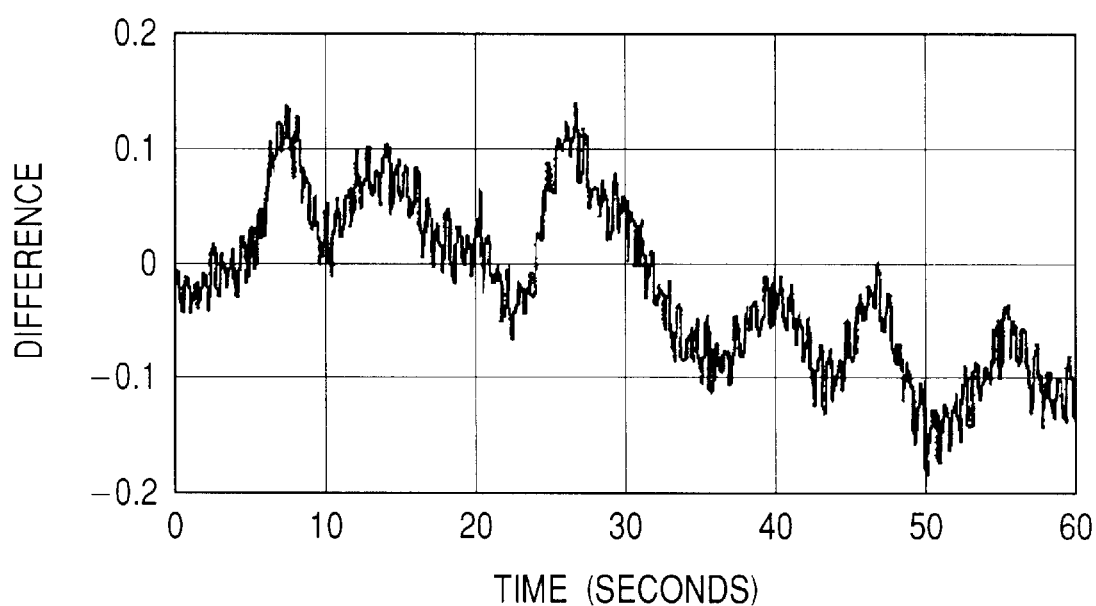
FIG. 18 is a view showing angle setting low [2] of the prow of the boat associated with the blood volume change of two players.

The angle (θ) formed by the bow of the boat can be freely set to right or left as shown in FIG. 17. To be more specific, as shown in FIG. 18, it can be decided on according to the difference in the intensity of transmitted light between the two players.

Figure 19:
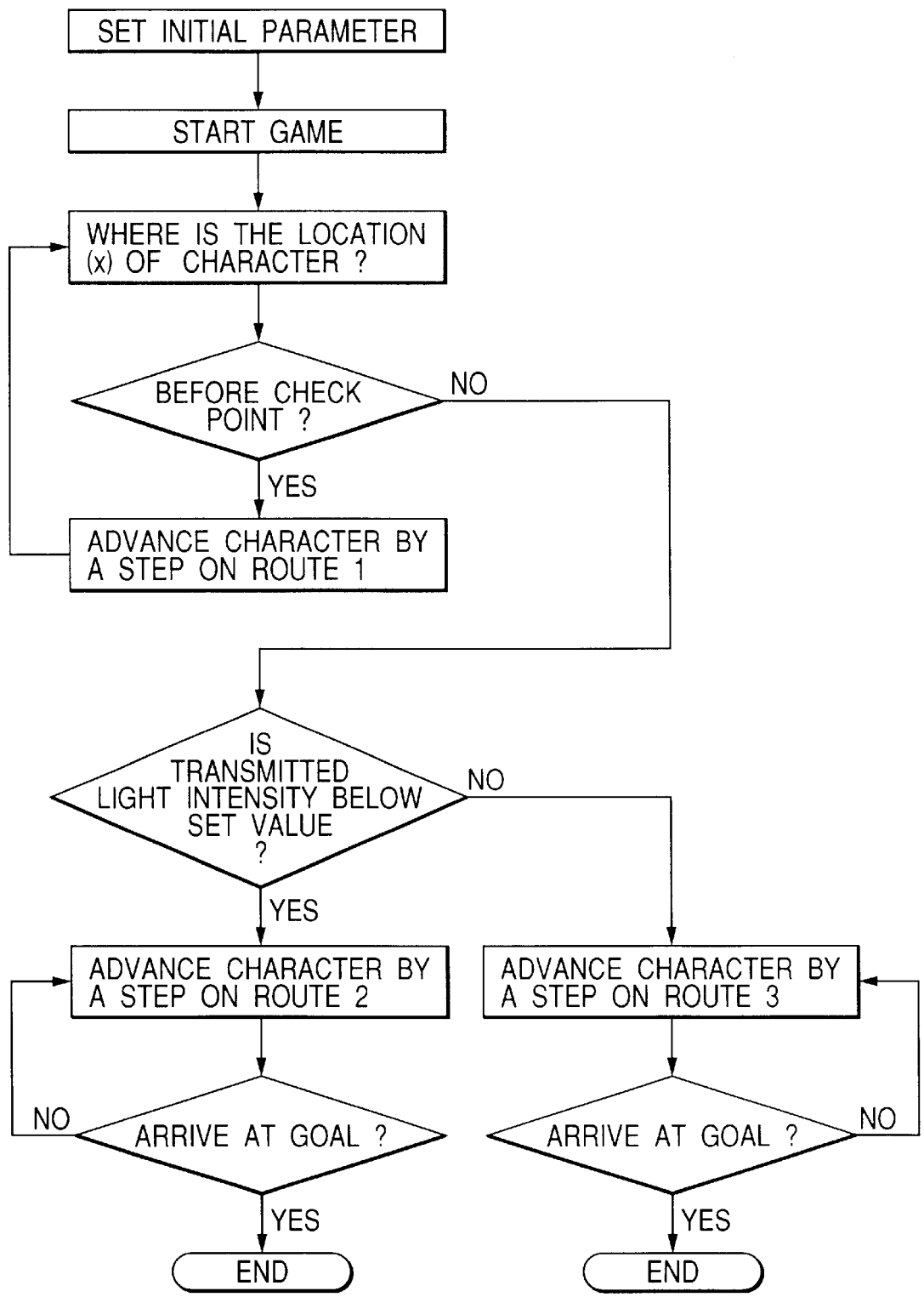
FIG. 19 is a flowchart of game contents [1]

A specific algorithm flowchart will be explained with reference to FIG. 19. First, a game is started. And the position of the boat is determined. The boat is moved until it reaches the checkpoint (16-4). When the boat reaches the checkpoint, measurement is taken of changes in the intensity of the light propagated through the living bodies of the player on the route (16-2) and the player on the route (16-3)—changes from before the start of activity of the brain. The differences of changes in the intensity are calculated, and when the change in the blood volume of the player on route 16-2 is large and when the change in the blood volume of the player on route 16-3 is large, the boats are made to go on the respective routes. And the positions of the boats are changed so that they may reach the goal.

In the two contents mentioned above, there is no need to show each checkpoint on the screen. For this reason, the player who can find such a checkpoint can enjoy the game with ease.

To enjoy a game using the above-mentioned amusement system, a head setter (probe) for the living body is needed to hold the optical fibers to irradiate with light on the skin of the subject and detect the transmitted light.

Figure 20:
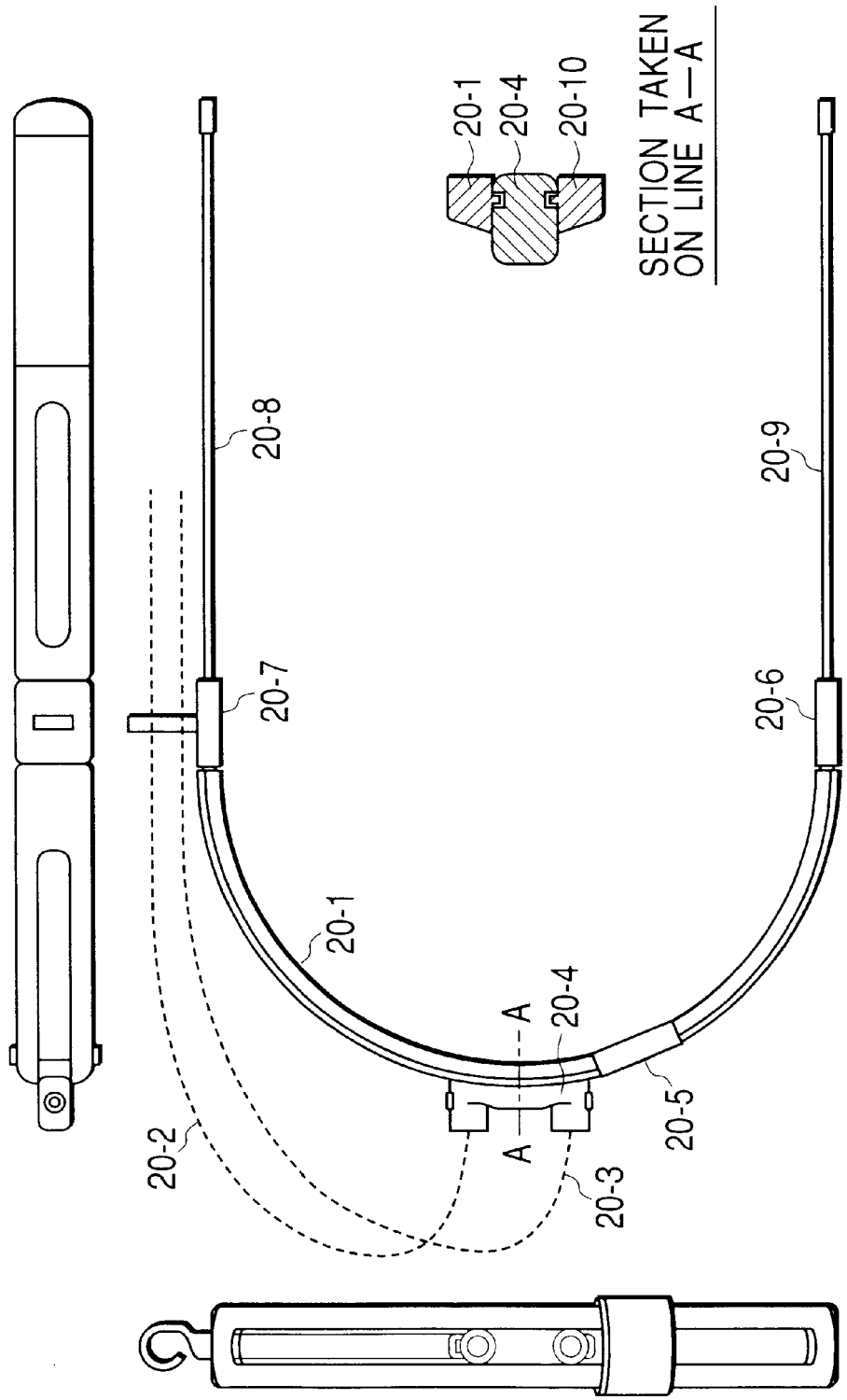
FIG. 20 is a view showing the structure of a probe according to the present invention.

The construction of the head setter will be explained. In FIG. 20, the upper drawing and the left drawing are side views of the head setter, of which the top view is shown in the same figure and the right drawing is a section taken on line A—A. Reference numeral 20-1 indicates a main body that is made of a flexible resin material. This main body is equipped with at least an optical fiber holder (20-4) for holding a pair of optical fibers—an optical fiber for irradiation (20-2) and an optical fiber for light detection (20-3)—and a stopper (20-5). The optical fiber holder (20-4) is so constructed as to move along a guide (20-10) disposed on the main body in a specific direction. Stopper (20-5) which is fixed on the main body, can reinforce the main body and can fix the optical fiber holder (20-4) at any position between the stopper and a joint (20-6). The head setter is also so designed that the optical fiber holder can detachably be disposed on the guide (20-10) therebetween. In the present example, one optical fiber holder is shown, but a plurality of optical fiber holders may be mounted.

To detect a change in blood volume with the activity of the brain, it is necessary to put the optical fiber for irradiation and the optical fiber for detection on the head skin of the subject 30 mm apart from each other. Therefore, if the stopper is put at a point 30 mm or more away from the center of the main body and if the probe can be worn upside down, the probe can be placed at any spot on the head skin of the frontal lobe.

If the optical fibers come within the player's field of vision, it can be an offense to the eye. Therefore, the probe is provided with an optical fiber hook (20-7) fixed on the joint (20-6) to hold the optical fiber for irradiation and the optical fiber for detection. Furthermore, the main body is connected to hook and loop fasteners (20-8, 20-9). The two fasteners shown in the drawing are adhered, so that the probe can be fixed on the head.

As set forth above, the present invention provides an amusement system using living body measurement by light that can be used pleasantly without the player feeling fatigue. Furthermore, the player can gasp the activity condition of his or her own brain. Using this system, rehabilitation can be conducted pleasantly, for example, and the possibility of application for this system is being opened in the welfare work field, too.

What is claimed is:

1. An amusement system using living body measurement by light, said system comprising:

a light irradiator for irradiating a living body of a player with light;

a light detector for detecting the light that has been emitted from said irradiator and which has propagated through the living body, wherein said irradiator and detector are placed on the living body;

a signal processor for processing the signal of light intensity detected by said detector; and a display unit for displaying the processing results from the signal processor on a screen;

wherein arrangements are so made as to set the range of displaying, on the screen of said display unit, a change in intensity of said transmitted light according to the results of a test task carried out on said living body, whereby said amusement system allows the player to play a game using an object displayed on the screen of said display unit, wherein said light irradiator and said light detector are installed in a head setter to be placed on the living body, said head setter having an optical fiber holder provided with at least a pair of optical fibers, one for irradiation and the other for detection, and a flexible resin part provided with a guide that enables the optical fiber holder to move in a specific direction, the optical fiber holder being detachably provided on the guide of said flexible resin part.

2. The amusement system using living body measurement by light of claim 1, wherein the range of displaying the change in the intensity of said transmitted light displayed on the screen of said display unit is decided on the basis of the maximum value and minimum value of the intensity of said transmitted light that is detected.

\* \* \* \* \*